(12) United States Patent
Esaki (10) Patent No.: US 12,236,151 B2
(45) Date of Patent: Feb. 25, 2025

(54) INFORMATION PROCESSING APPARATUS, INFORMATION PROCESSING SYSTEM, AND NON-TRANSITORY COMPUTER READABLE MEDIUM STORING PROGRAM FOR DISPLAYING CONTENT ON VIRTUAL SCREEN

(71) Applicant: FUJIFILM Business Innovation Corp., Tokyo (JP)

(72) Inventor: Tatsuyuki Esaki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 625 days.

(21) Appl. No.: 17/329,190

(22) Filed: May 25, 2021

(65) Prior Publication Data

US 2022/0197580 A1 Jun. 23, 2022

(30) Foreign Application Priority Data

Dec. 23, 2020 (JP) ................................ 2020-214315

(51) Int. Cl.
*G06F 3/14* (2006.01)
*G02B 27/01* (2006.01)

(52) U.S. Cl.
CPC ....... *G06F 3/1423* (2013.01); *G02B 27/0172* (2013.01); *G02B 2027/014* (2013.01)

(58) Field of Classification Search
CPC .................................................... G06F 3/1423
See application file for complete search history.

(56) References Cited

U.S. PATENT DOCUMENTS

| 10,628,104 B2 | 4/2020 | Iwamoto |
| 2017/0325907 A1 | 11/2017 | Maeda et al. |
| 2019/0073109 A1 | 3/2019 | Zhang et al. |

FOREIGN PATENT DOCUMENTS

| JP | 2012080376 | 4/2012 |
| JP | 2015049695 | 3/2015 |
| JP | 2016115965 | 6/2016 |
| JP | 2019117505 | 7/2019 |
| JP | 2020034646 | 3/2020 |
| JP | 2020064652 | 4/2020 |

OTHER PUBLICATIONS

"Office Action of Japan Counterpart Application", issued on May 21, 2024, with English translation thereof, p. 1-p. 5.

*Primary Examiner* — Gustavo Polo
(74) *Attorney, Agent, or Firm* — JCIPRNET (57) ABSTRACT

An information processing apparatus includes: a light-transmission member disposed in a line-of-sight direction of a user when the information processing apparatus is worn on a user's head; and a processor configured to: switch between displaying of a virtual screen to be superimposed on a real space through the light-transmission member when the information processing apparatus is worn on the user's head and displaying of a display content of the virtual screen on the light-transmission member when the information processing apparatus is not worn on the user's head.

15 Claims, 11 Drawing Sheets

INFORMATION PROCESSING APPARATUS, INFORMATION PROCESSING SYSTEM, AND NON-TRANSITORY COMPUTER READABLE MEDIUM STORING PROGRAM FOR DISPLAYING CONTENT ON VIRTUAL SCREEN

CROSS-REFERENCE TO RELATED APPLICATIONS

This application is based on and claims priority under 35 USC 119 from Japanese Patent Application No. 2020-214315 filed Dec. 23, 2020.

BACKGROUND

(i) Technical Field

The present invention relates to an information processing apparatus, an information processing system, and a non-transitory computer readable medium storing a program.

(ii) Related Art

In the related art, there is a wearable terminal apparatus that can superimpose and display a virtual screen in a real space and visually recognize the virtual screen in the real space. In a case where this wearable terminal apparatus has a glasses type, the wearable terminal apparatus may be called, for example, smart glasses.

JP2020-034646A describes a wearable terminal having a display function. A terminal attachment and detachment detection unit of this wearable terminal detects attachment and detachment of the wearable terminal to a head of a user. A user authentication unit authenticates the user who uses the wearable terminal. A screen display control unit superimposes a screen of a processing apparatus that operates according to an operation of an operation device by the user on a background to display the screen and the background on a display surface. The screen display control unit displays a personal computer screen in a case where wearing is detected and the user is authenticated. The screen display control unit performs an information amount reduction process for reducing the amount of information to be displayed on the display surface in a case where detachment of the wearable terminal is detected. After that, in a case where a user authentication process is performed after the detection of the wearing of the wearable terminal is performed, the screen display control unit performs an information amount recovery process to restore the amount of information reduced by the information amount reduction process.

JP2019-117505A describes an electronic device that can be connected to a wearable device including a display unit, a mounting sensor, and an orientation sensor. This electronic device includes a display screen direction control unit.

The display screen direction control unit controls a direction of a screen of the display unit based on an orientation of the wearable device detected by an orientation sensor, for a predetermined time from a time when the mounting sensor detects that a user wears the wearable device.

SUMMARY

The user may want to acquire information on the virtual screen not only when the wearable terminal apparatus is worn but also when the wearable terminal apparatus is not worn. That is, it is required that the user can visually recognize display contents of the virtual screen even when the wearable terminal apparatus is not worn.

Aspects of non-limiting embodiments of the present disclosure relate to an information processing apparatus, an information processing system, and a non-transitory computer readable medium storing a program that visually recognize display contents of a virtual screen not only when the information processing apparatus is worn but also in a case where the information processing apparatus is not worn.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including: a light-transmission member disposed in a line-of-sight direction of a user when the information processing apparatus is worn on a user's head; and a processor configured to: switch between displaying of a virtual screen to be superimposed on a real space through the light-transmission member when the information processing apparatus is worn on the user's head and displaying of a display content of the virtual screen on the light-transmission member when the information processing apparatus is not worn on the user's head.

BRIEF DESCRIPTION OF THE DRAWINGS

Exemplary embodiment(s) of the present invention will be described in detail based on the following figures, wherein.

DETAILED DESCRIPTION

Structure of Smart Glasses 10

Hereinafter, exemplary embodiments of the present invention will be described in detail with reference to drawings.

Figure 1:
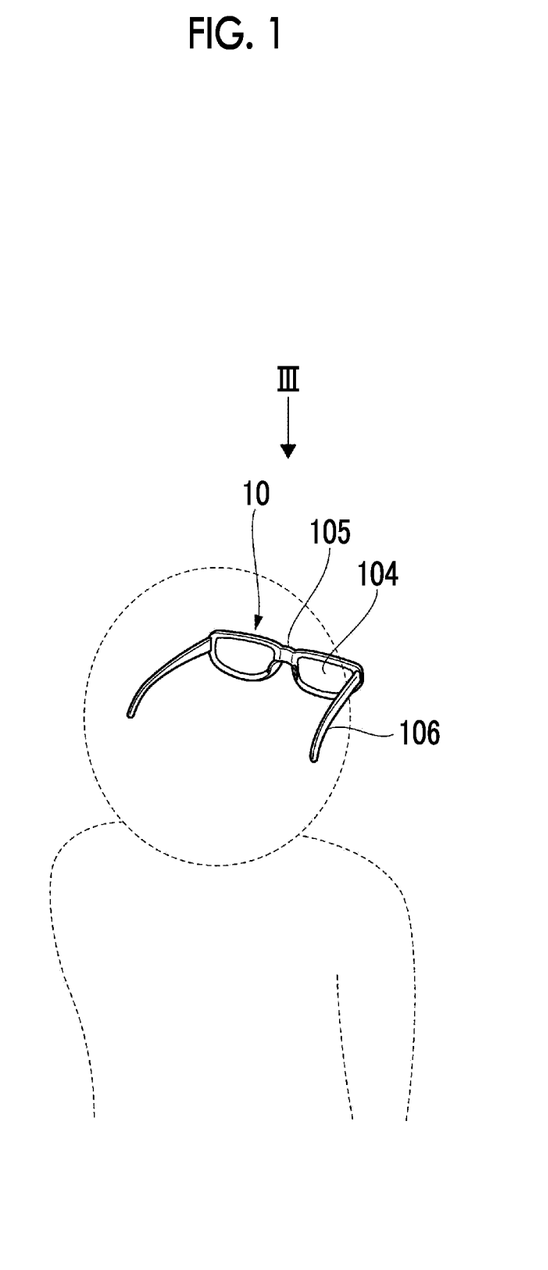
FIG. 1 is a diagram illustrating a configuration of smart glasses to which the present exemplary embodiment is applied.

FIG. 1 is a diagram illustrating a configuration of smart glasses 10 to which the present exemplary embodiment is applied.

The smart glasses 10 is an example of an information processing apparatus, and is a so-called glasses-type wearable terminal apparatus. Here, "wearable" means that a user can wear the terminal apparatus. Therefore, the glasses-type wearable terminal apparatus is a computer apparatus that has a shape of glasses and can be actually worn by the user. The smart glasses 10 have the glasses type, and include a lens unit 104, a bridge 105, and a temple 106. The "lens" is a name as a component of the lens unit 104 in the glasses-type wearable terminal apparatus, and also includes a portion which is not spherical.

The smart glasses 10 display a virtual screen superimposed in a real space. That is, the user can visually recognize the virtual screen with the smart glasses 10, and can visually recognize the real space through the lens unit 104 of the smart glasses 10.

Display contents on the virtual screen include, for example, exercise data such as the number of steps, calories burned, a traveling distance, health data such as the user's heart rate and blood pressure, notification data such as incoming emails and messages, guidance data such as surrounding maps or guides, and the like.

Here, the smart glasses 10 are illustrated as a so-called glasses-type apparatus, and a shape, a format, or the like of the smart glasses 10 that are worn with the user's head and display a virtual screen to the user are not particularly limited. Further, the smart glasses 10 may be so-called AR glasses having a function of recognizing the surrounding environment. In this case, the AR glass recognizes a wall or floor in the real space with a camera or a sensor. The virtual screen superimposed in the real space is displayed to the user, and AR is displayed. Here, "AR" means "Augmented Reality". Further, the "virtual screen" is a display of an image created by a computer and does not exist in the real space, and the "real space" is a space that actually exists.

Figure 2:
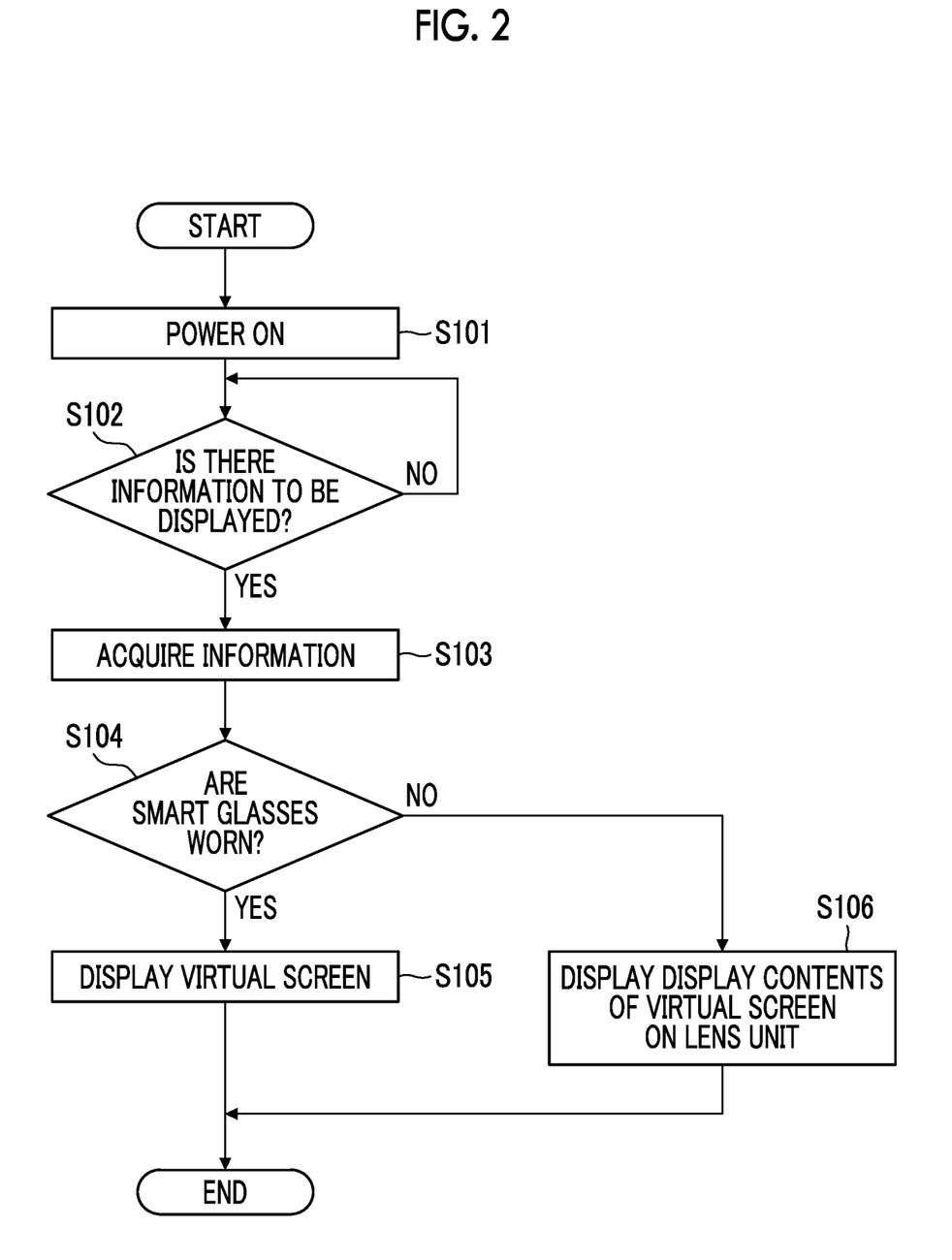
FIG. 2 is a flowchart illustrating an operation of the smart glasses.

FIG. 2 is a flowchart illustrating an operation of the smart glasses 10.

First, the user turns on power of the smart glasses 10 (step S101). As a result, each mechanical unit of the smart glasses 10 is activated.

Next, the smart glasses 10 determine whether or not there is information to be displayed by the smart glasses 10 (step S102). For example, the smart glasses 10 performs polling on a device such as a cloud server or a smartphone that acquires information to perform the determination. Further, the smart glasses 10 may determine whether or not there is information based on the presence or absence of a push notification from these devices.

As a result, in a case where there is no information to be displayed (No in step S102), the process returns to step S102.

On the other hand, in a case where there is the information to be displayed (Yes in step S102), the smart glasses 10 acquires the information (step S103).

The smart glasses 10 determine whether or not the user wears the smart glasses 10 (step S104).

As a result, in a case where the user wears the smart glasses 10 (Yes in step S104), the smart glasses 10 display the virtual screen to the user (step S105). As a result, the user who wears the smart glasses 10 can visually recognize the virtual screen displayed by the smart glasses 10.

On the other hand, in a case where the user does not wear the smart glasses 10 (No in step S104), the smart glasses 10 display display contents of the virtual screen on the lens unit 104 (step S106). As a result, the user who does not wear the smart glasses 10 can visually recognize the display contents of the virtual screen displayed on the lens unit 104 of the smart glasses 10.

In the smart glasses 10 according to the present exemplary embodiment, when the smart glasses 10 are worn on the user's head, a virtual screen is superimposed on the real space and displayed through the lens unit 104, and when the smart glasses 10 are not worn on the user's head, the display of the display contents of the virtual screen is switched to the lens unit 104.

Hereinafter, this configuration will be described in detail.

DISPLAY EXAMPLE

In step S105 in FIG. 2, a display example in a case where a virtual screen is displayed to the user is described, and in step S106 in FIG. 2, another display example in a case where the display contents of the virtual screen are displayed on the lens unit 104 is described.

Display Example 1

Figure 3:
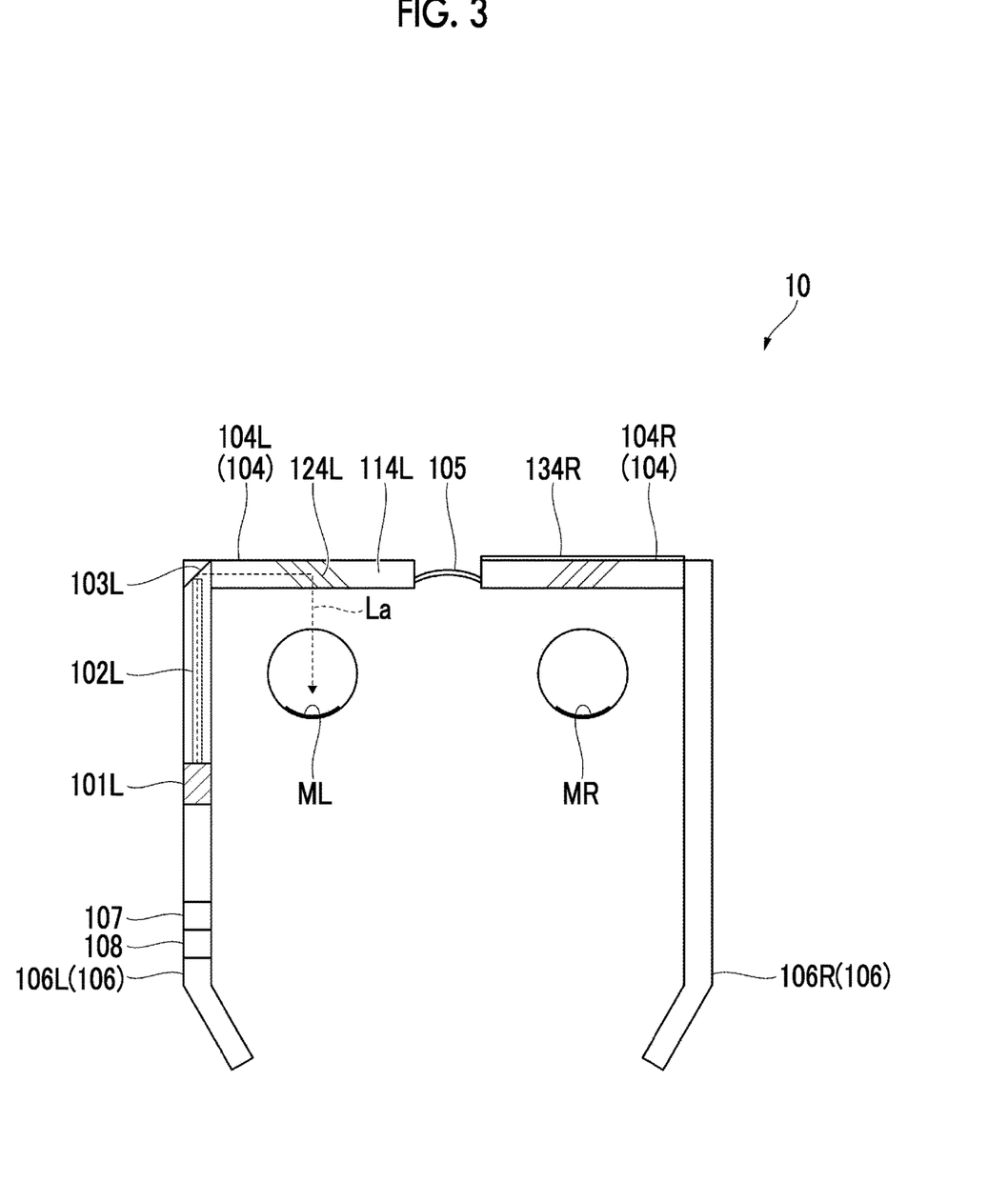
FIG. 3 is a diagram illustrating an optical system of smart glasses that display a screen according to Display Example 1.

FIG. 3 is a diagram illustrating an optical system of the smart glasses 10 that displays a screen according to Display Example 1.

FIG. 3 illustrates the smart glasses 10 when viewed from the direction III in FIG. 1. In FIG. 3, when the user wears the smart glasses 10, a reference numeral of a member on the left side is indicated by "L", and a reference numeral of a member on the right side is indicated by "R".

As the smart glasses 10 that implements displaying a virtual screen, there are various methods such as a virtual image projection method and a retinal projection method, and any method may be used. The smart glasses 10 have, for example, the following configuration. The smart glasses 10 have the retinal projection method.

The smart glasses 10 includes a laser light source 101L, an optical fiber 102L, a mirror 103L, lens units 104L and 104R, a bridge 105, temples 106L and 106R, a communication module 107, and a glass mode module 108.

The laser light source 101L is a light source for creating a virtual screen. The laser light source 101L uses three color lasers of red, green, and blue, and can create a full-color virtual screen by switching at high speed.

The optical fiber 102L is provided inside of the temple 106L, and guides laser light La emitted from the laser light source 101 to the mirror 103L. The optical fiber 102L may be made any of glass or plastic.

The mirror 103L reflects a traveling direction of the laser light La at an approximately perpendicular angle, and guides the laser light to the lens unit 104L. The mirror 103L can swing up or down and left or right to change the angle of incidence on the lens unit 104L. Therefore, a position of reaching a retina ML of the user is also changed up or down and left or right. As a result, the user can visually recognize a two-dimensional image as the virtual screen.

The lens units 104L and 104R are examples of two lenses, and are examples of light-transmission members arranged in a line-of-sight direction of the user when the smart glasses 10 are worn on the user's head. Here, the "light-transmission member" is a member through which visible light passes. The light-transmission member does not have to pass all visible light. That is, the light-transmission member may have a function as a so-called filter that passes some light beams having wavelengths in apart of a visible light area. The lens units 104L and 104R have a light guide unit 114L and a reflection unit 124L inside. The light guide unit 114L and 114R guides the laser light La in a direction of the bridge 105 by totally reflecting the laser light La of which angle is changed by the mirror 103L, respectively. The reflection unit 124L reflects the laser light La guided by the light guide unit 114L in an approximately perpendicular direction, and changes the traveling direction of the laser light La in a direction of the retina ML of the user's left eye.

Further, since the lens units 104L and 104R are light-transmission members, the user can visually recognize the real space through the lens units 104L and 104R. As a result, the user can visually recognize the virtual screen superimposed on the real space.

Since the smart glasses 10 have the glasses type, the expression "lens unit" is used here for convenience, and it is not necessary to actually have a function as a lens. That is, the lens units 104L and 104R do not need to have an optical function of refracting light.

Further, the lens unit 104R includes a display unit 134R. The display unit 134R is a transmissive display, and when the display is not performed, the background can be seen through. That is, when the display unit 134R does not perform the display, the user can see the real space through the lens unit 104R. The transmissive display includes various types such as a transmissive organic electroluminescence (EL) display, a transmissive inorganic EL display, and a transmissive liquid crystal display, and is not particularly limited. In a case of the transmissive organic EL display or the transmissive inorganic EL display, display contents are displayed by a light emitting element arranged on the display unit 134R.

The bridge 105 is a member for supporting the smart glasses 10 by hanging on the user's nose and wearing the smart glasses 10 with the user's head.

Further, the temples 106L and 106R are members for supporting the smart glasses 10 by putting the smart glasses 10 on the user's ears and wearing the smart glasses 10 to the user's head.

The communication module 107 is a communication interface for communicating with the outside.

The glass mode module 108 controls an operation of the laser light source 101L and the mirror 103L in a case where the virtual screen is displayed. Further, in a case where the display unit 134R displays the display contents of the virtual screen, the display unit 134R is controlled. The glass mode module 108 can be realized by using a CPU, an internal memory, and an external memory, and by operating a control software for controlling the laser light source 101L, the mirror 103L, and the display unit 134R. Here, the CPU is an example of a processor.

When the user wears the smart glasses 10, the laser light La is emitted from the laser light source 101L described above, and the virtual screen is displayed to the user. At this time, the display is not performed on the display unit 134R. On the other hand, when the user does not wear the smart glasses 10, the display contents on the virtual screen are displayed on the display unit 134R. At this time, the laser light La is not emitted from the laser light source 101L, and the virtual screen is not displayed.

In the smart glasses 10, the display contents of the virtual screen are displayed on one of the lens units 104L and 104R. Here, one of the two lens units 104L and 104R, that is, the lens unit 104L is used to superimpose and display the virtual screen on the real space through the lens unit 104L. Further, the other lens unit 104R is used to display the display contents of the virtual screen.

Figure 4A:
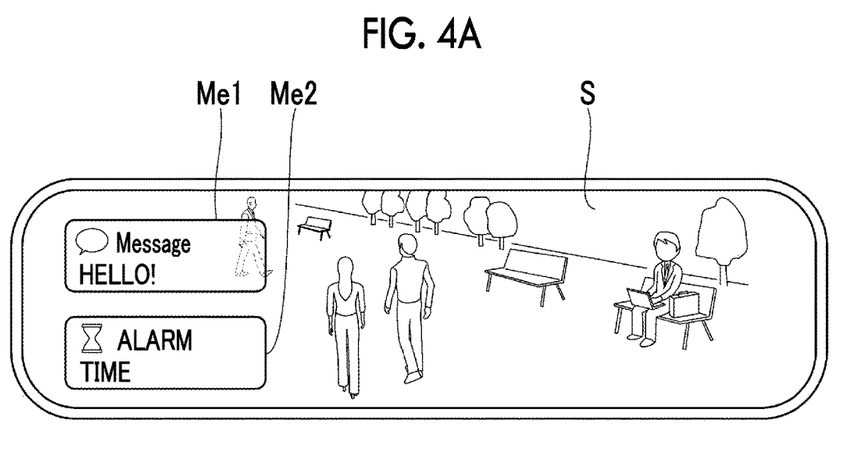
FIGS. 4A and 4B are diagrams illustrating Display Example 1.
Figure 4B:
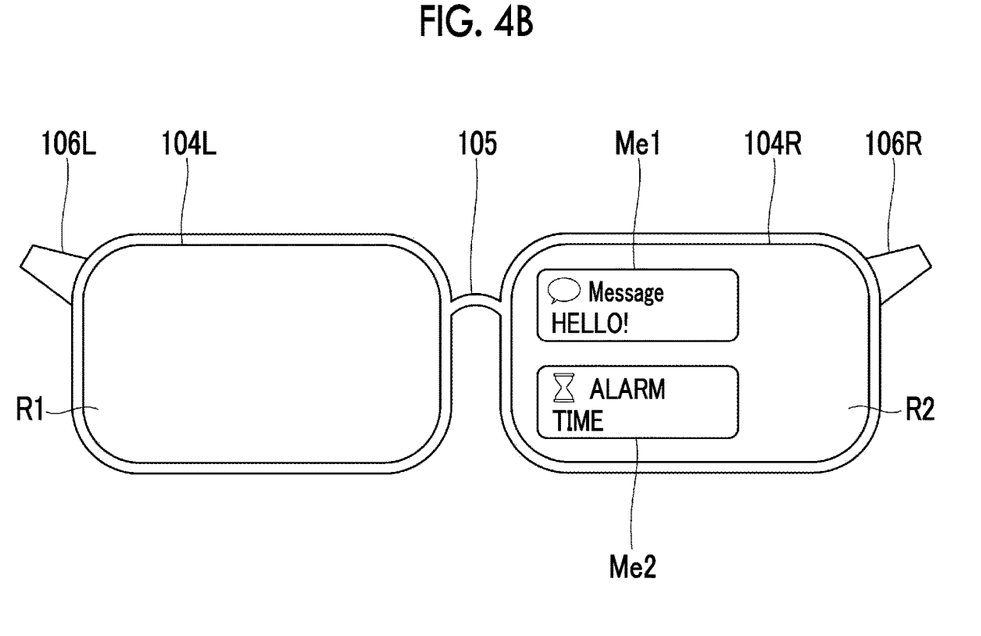

FIGS. 4A and 4B are diagrams illustrating Display Example 1.

In FIGS. 4A and 4B, FIG. 4A illustrates a state of vision when the user wears the smart glasses 10. Further, FIG. 4B illustrates a screen displayed on the lens unit 104R in a case where the user does not wear the smart glasses 10.

When the user wears the smart glasses 10, as illustrated in FIG. 4A, a real space S can be visually recognized through the lens units 104L and 104R. Further, a virtual screen is displayed by superimposing the virtual screen on the real space S. Here, a state in which messages Me1 and Me2 are displayed as the virtual screens is illustrated. In this case, of the two lens units 104L and 104R, it is considered that the lens unit 104L is a first area R1 for displaying the virtual screen superimposed on the real space S, and the lens unit 104R is a second area R2 used to display display contents of the virtual screen.

When the user does not wear the smart glasses 10, as illustrated in FIG. 4B, the lens unit 104R displays identical display contents with the contents of the virtual screen. Actually, the display unit 134R of the lens unit 104R displays this screen. Here, in the same manner as in FIG. 4A, FIG. 4B illustrates a state in which the messages Me1 and Me2 are displayed on the lens unit 104R.

Meanwhile, densities of the messages Me1 and Me2 displayed in FIG. 4B may be changed for the messages Me1 and Me2 on the virtual screen displayed in FIG. 4A. For example, a density is set to be higher than the messages Me1 and Me2 on the virtual screen. As a result, when the virtual screen is displayed as illustrated in FIG. 4A, the densities of the messages Me1 and Me2 are reduced, and the messages Me1 and Me2 do not interfere with the user's visual recognition of the real space S. Transparency of the messages Me1 and Me2 may be increased so that the real space S can be visually recognized through the messages Me1 and Me2.

On the other hand, as illustrated in FIG. 4B, when the contents of the virtual screen are displayed on the lens unit 104R, the user does not need to visually recognize the real space S, so that the densities of the messages Me1 and Me2 are increased, and visibility of the messages Me1 and Me2 is improved. The transparency of the messages Me1 and Me2 may be lowered to make the messages Me1 and Me2 more visible.

Further, the messages Me1 and Me2 displayed in FIG. 4B may be enlarged than the messages Me1 and Me2 on the virtual screen displayed in FIG. 4A. As a result, when the virtual screen is displayed as illustrated in FIG. 4A, the messages Me1 and Me2 are displayed in a small size so that the messages Me1 and Me2 do not interfere with the user's visual recognition of the real space S. On the other hand, as illustrated in FIG. 4B, when the contents of the virtual screen are displayed on the lens unit 104R, the user does not need to visually recognize the real space S, so that the messages Me1 and Me2 are displayed in a large size, and the visibility of the messages Me1 and Me2 is improved.

Further, even in a case where display contents identical with the contents of the virtual screen are displayed on the lens unit 104R, the layout may be changed. Specifically, a shape and an aspect ratio of the message, a relative size of a text or an icon in the message, and the like may differ between the virtual screen and the contents displayed on the lens unit 104.

Display Example 2

Figure 5:
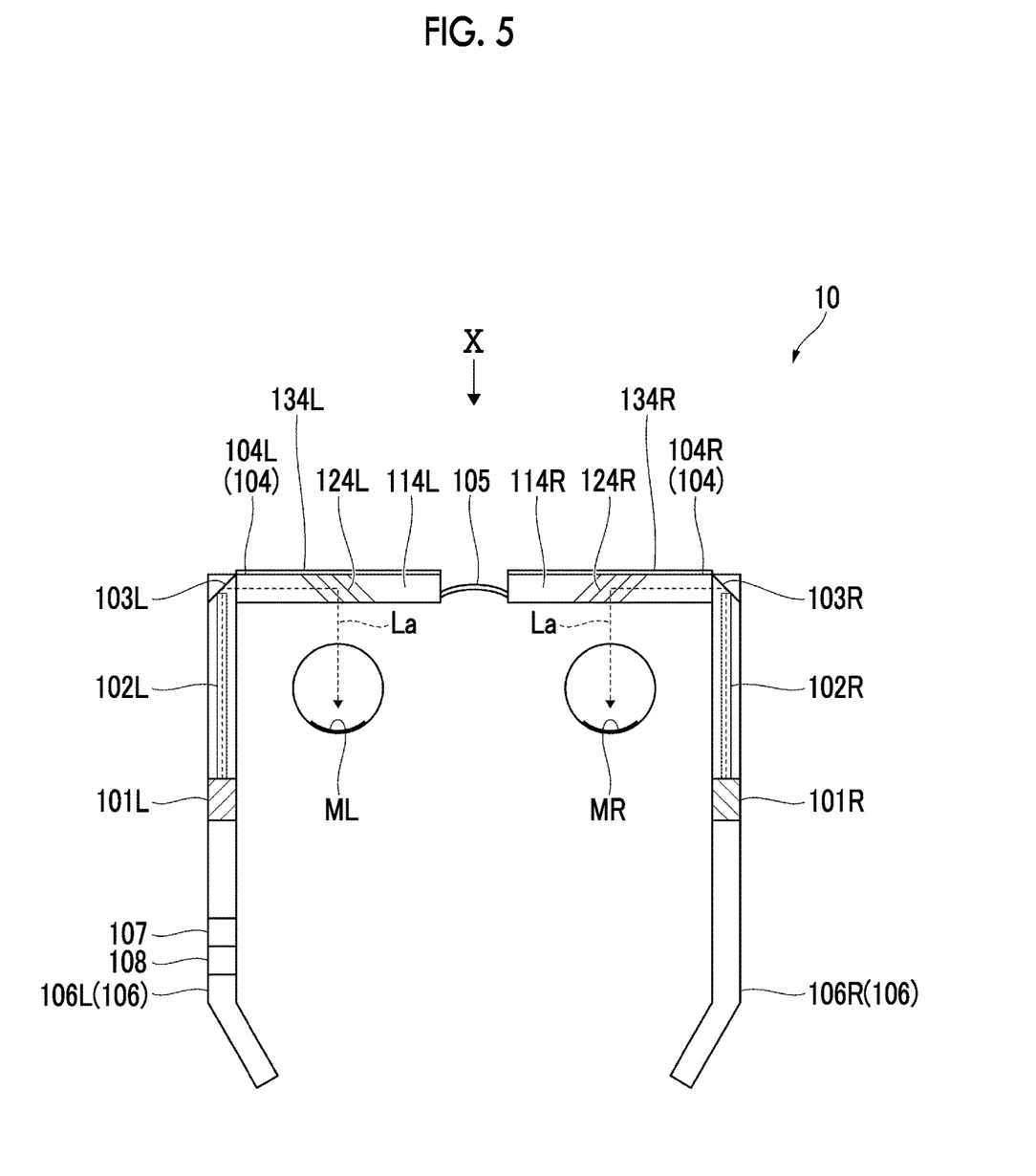
FIG. 5 is a diagram illustrating an optical system of smart glasses that display a screen according to Display Example 2.

FIG. 5 is a diagram illustrating an optical system of the smart glasses 10 that display a screen according to Display Example 2. Display Examples after Display Example 3, which will be described later, have the same optical system as the optical system in FIG. 5.

As compared with the optical system illustrated in FIG. 3, the optical system of the smart glasses 10 illustrated in FIG. 5 uses both the left and right lens units 104L and 104R to display a virtual screen. Further, both the display units 134L and 134R can be used to display identical display contents with the contents of the virtual screen.

Therefore, a laser light source, which is a light source, has two left and right systems of laser light sources 101L and 101R. In the same manner, an optical fiber, a mirror, and a display unit also respectively have two systems on the left and right of optical fibers 102L and 102R, mirror 103L and 103R, and display units 134L and 134R. As a result, the laser light La reaches the retinas ML and MR of both eyes of the user. Further, both the display units 134L and 134R display identical display contents with the contents of the virtual screen. Each of these functions has the same manner as the case described with reference to FIG. 3.

Figure 6A:
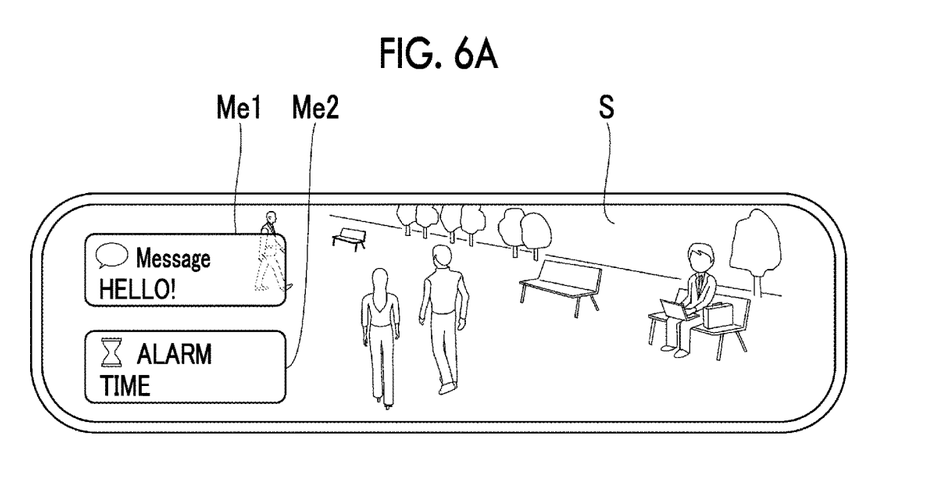
FIGS. 6A and 6B are diagrams illustrating Display Example 2.
Figure 6B:
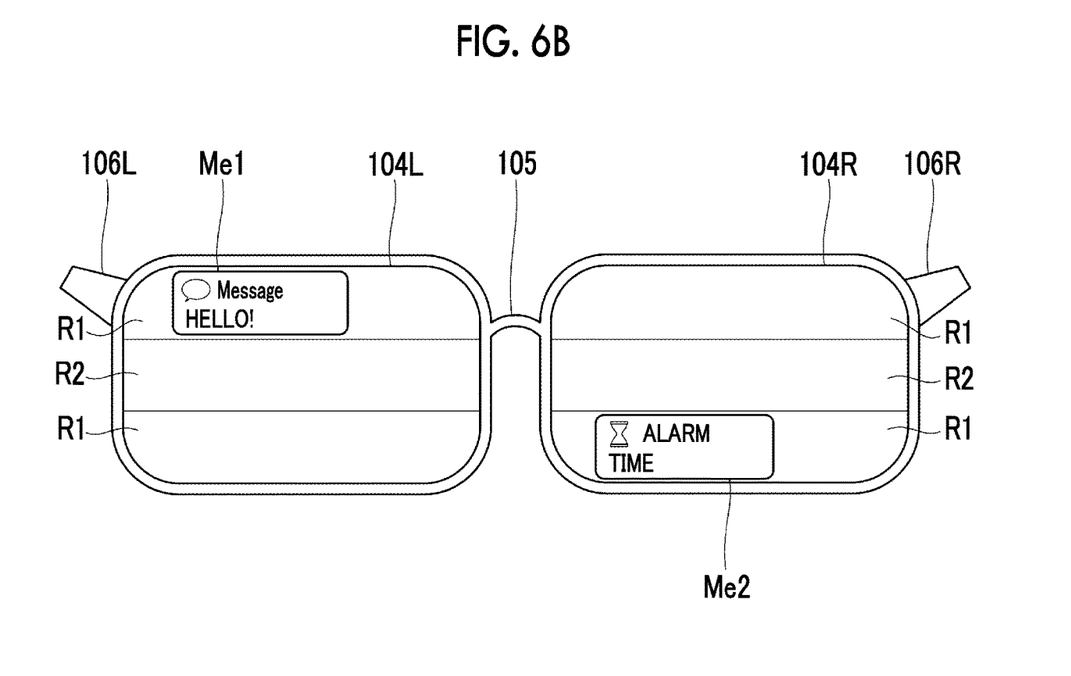

FIGS. 6A and 6B are diagrams illustrating Display Example 2.

FIG. 6A illustrates a state of vision when the user wears the smart glasses 10. Further, FIG. 6B illustrates a screen displayed on the lens units 104L and 104R in a case where the user does not wear the smart glasses 10.

When the user wears the smart glasses 10, as illustrated in FIG. 6A, the real space S can be visually recognized through the lens units 104L and 104R. Further, a virtual screen is displayed by superimposing the virtual screen on the real space S. Here, a state in which messages Me1 and Me2 are displayed as the virtual screens is illustrated. The state has the same manner as the case in FIG. 4A.

When the user does not wear the smart glasses 10, as illustrated in FIG. 6B, the lens units 104L and 104R display identical display contents with the contents of the virtual screen. Actually, the display unit 134R of the lens unit 104L and the display unit 134R of the lens unit 104R display this screen.

Meanwhile, here, the message Me1 is displayed on the lens unit 104L, and the message Me2 is displayed on the lens unit 104R. That is, the left and right lens units 104L and 104R are used properly to display the message Me1 and the message Me2, which are different display contents.

Further, the two lens units 104L and 104R include the first area R1 for displaying the virtual screen superimposed on the real space S, and the second area R2 used to display the display contents of the virtual screen on the lens units 104L and 104R. That is, the first area R1 is an area for the user visually recognizing the virtual screen without providing the display units 134L and 134R. In addition, the second area R2 is provided with display units 134L and 134R to display the display contents of the virtual screen. Since it is difficult to manufacture the lens units 104L and 104R for providing the first area R1 and the second area R2 in an overlapping manner, it is preferable that these areas are separately provided on the lens units 104L and 104R, for example.

In a case in FIGS. 6A and 6B, the first area R1 and the second area R2 are arranged so as to be vertically divided inside the lens units 104L and 104R in a case where the user wears the smart glasses 10. In this case, the first area R1 and the second area R2 are provided to be divided into three so as to be from the upper direction to the lower direction, that is, the first area R1 the second area R2→the first area R1 in a case where the user wears the smart glasses 10. The number of divisions is not limited to this, and may be divided into two, one of which may be the first area R1 and the other of which may be the second area R2, for example.

Display Example 3

Figure 7A:
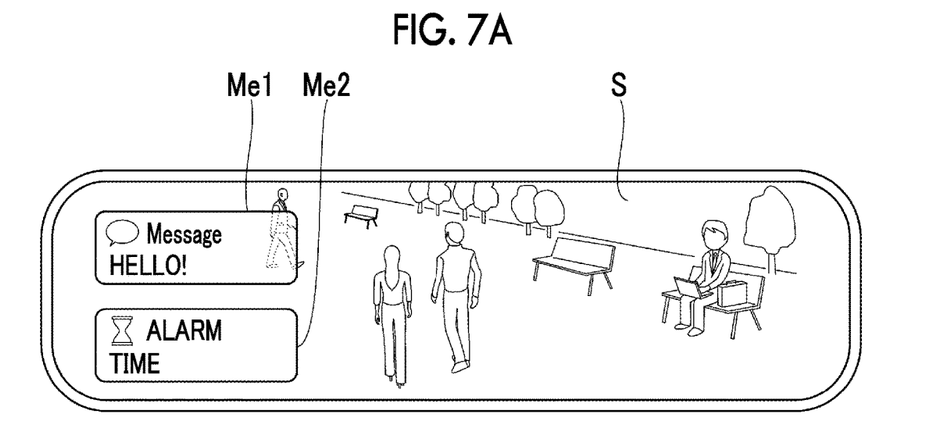
FIGS. 7A and 7B are diagrams illustrating Display Example 3.
Figure 7B:
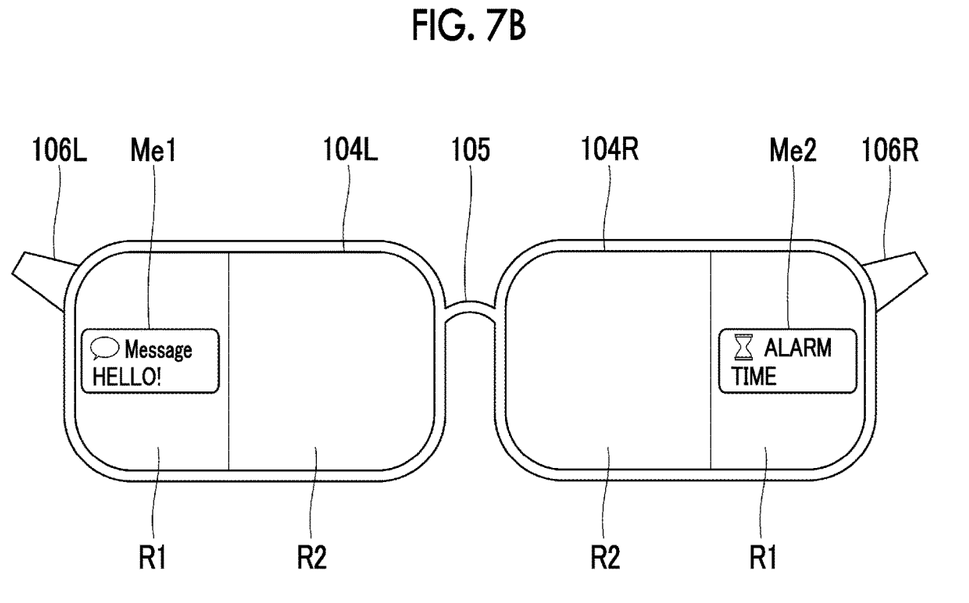

FIGS. 7A and 7B are diagrams illustrating Display Example 3.

FIG. 7A illustrates a state of vision when the user wears the smart glasses 10. Further, FIG. 7B illustrates a screen displayed on the lens units 104L and 104R in a case where the user does not wear the smart glasses 10.

A case in FIG. 7A in which the user wears the smart glasses 10 has the same manner as the case in FIG. 6A.

When the user does not wear the smart glasses 10, as illustrated in FIG. 7B, the lens units 104L and 104R display identical display contents with contents of a virtual screen. Here, in the same manner as in FIG. 6B, the messages Me1 and Me2 are displayed on both the lens units 104L and 104R, and the two lens units 104L and 104R have the first area R1 and the second area.

Meanwhile, in a case in FIG. 7B, the first area R1 is arranged at a location outside the second area R2 in a case where the user wears the smart glasses 10. In this case, the first area R1 and the second area R2 are provided to be divided into two so as to be in a direction from the bridge 105 toward the temples 106L and 106R, that is, the second area R2→the first area R1. By providing the first area R1, on the temples 106L and 106R sides, outside the second area R2, the laser light La can be emitted to the first area R1 without passing through the second area R2.

Display Example 4

Figure 8A:
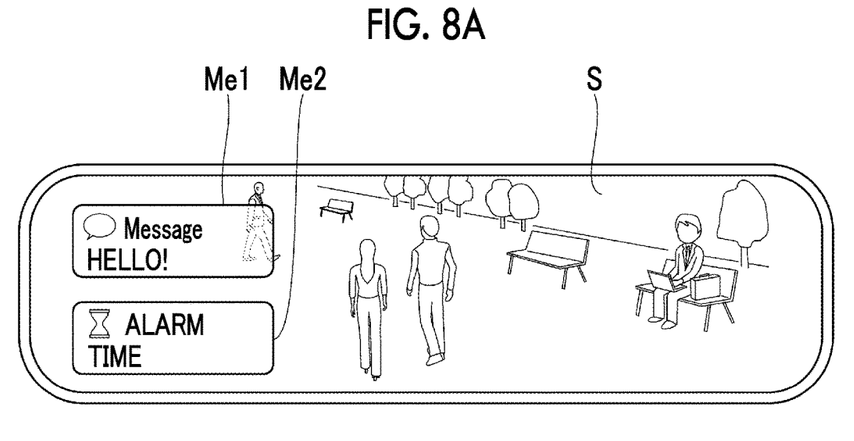
FIGS. 8A and 8B are diagrams illustrating Display Example 4.
Figure 8B:
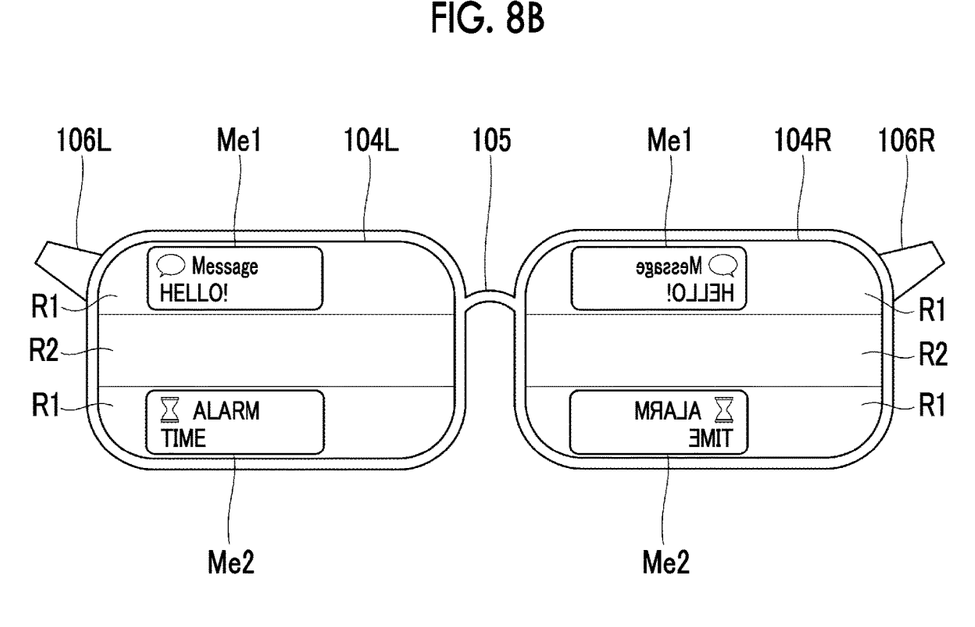

FIGS. 8A to 8B are diagrams illustrating Display Example 4.

FIG. 8A illustrates a state of vision when the user wears the smart glasses 10. Further, FIG. 8B illustrates a screen displayed on the lens units 104L and 104R in a case where the user does not wear the smart glasses 10.

A case in FIG. 8A in which the user wears the smart glasses 10 has the same manner as the case in FIG. 6A.

When the user does not wear the smart glasses 10, as illustrated in FIG. 8B, the lens units 104L and 104R display identical display contents with contents of a virtual screen. Here, the messages Me1 and Me2 are displayed on both the lens units 104L and 104R.

Meanwhile, here, the messages Me1 and Me2 are respectively displayed on the two lens units 104L and 104R so as to have a front-rear relationship. As a result, even in a case where the user views from either of two surfaces of the lens units 104L and 104R, the messages Me1 and Me2 are displayed on one of the two lens units 104L and 104R in a normal direction, and the message Me1 and Me2 are displayed, and not displayed inside out. As a result, the user can visually recognize the messages Me1 and Me2 in the normal direction.

Display Example 5

Figure 9A:
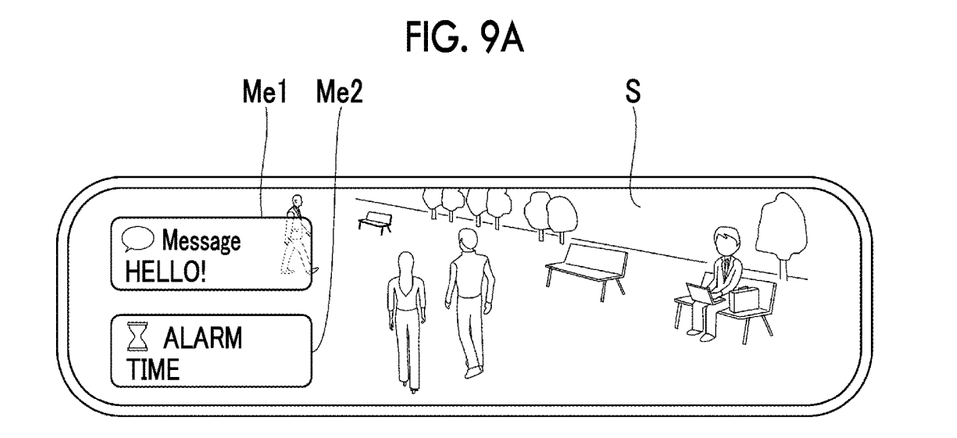
FIGS. 9A and 9B are diagrams illustrating Display Example 5.
Figure 9B:
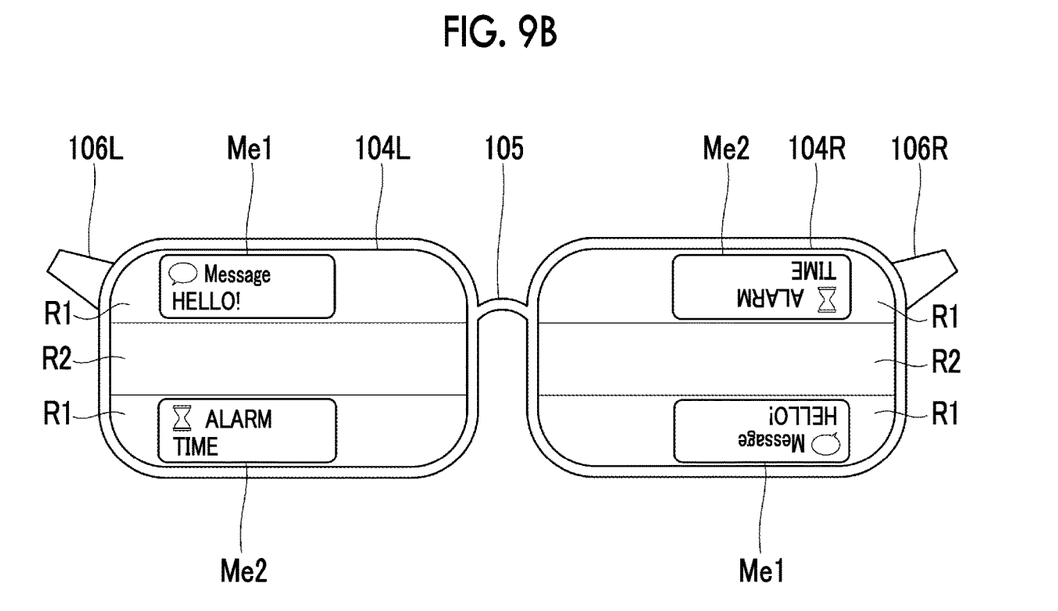

9A to 9B are diagrams illustrating Display Example 5.

FIG. 9A illustrates a state of vision when the user wears the smart glasses 10. Further, FIG. 9B illustrates a screen displayed on the lens units 104L and 104R in a case where the user does not wear the smart glasses 10.

A case in FIG. 9A in which the user wears the smart glasses 10 has the same manner as the case in FIG. 6A.

When the user does not wear the smart glasses 10, as illustrated in FIG. 9B, the lens units 104L and 104R display identical display contents with contents of a virtual screen. Here, the messages Me1 and Me2 are displayed on both the lens units 104L and 104R.

Meanwhile, here, the messages Me1 and Me2 are respectively displayed on the two lens units 104L and 104R so as to have a front-rear reversed relationship.

FIGS. 10A to 10D are diagrams illustrating a state when the user places the smart glasses 10. In this case, a case where the smart glasses 10 are viewed from the X direction in FIG. 5 is illustrated.

Figure 10A:
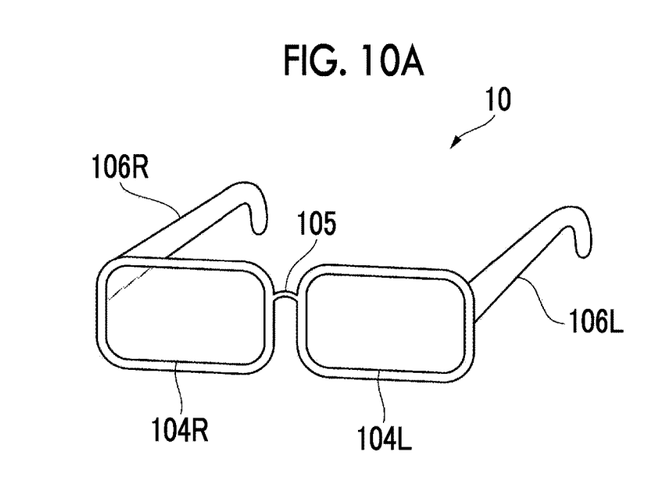
FIGS. 10A to 10D are diagrams illustrating a state when a user places the smart glasses.
Figure 10B:
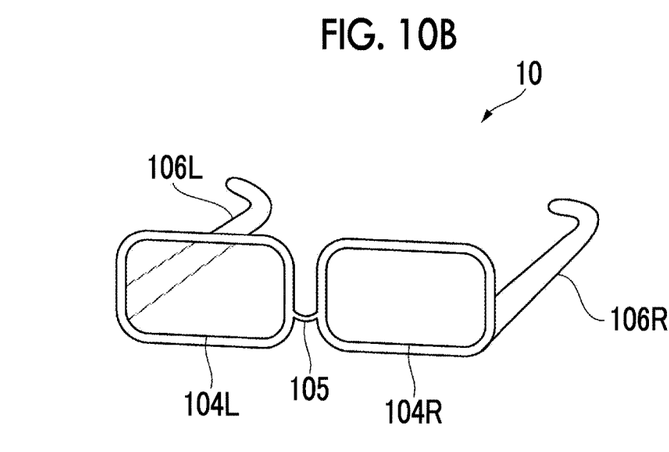

When the user places the smart glasses 10, a placed direction is considered to have two ways, one is when the smart glasses 10 is placed in a wearing direction as illustrated in FIG. 10A, and the other is when the smart glasses 10 is placed a front-rear reversed direction to the wearing state as illustrated in FIG. 10B. When placed in any direction, the messages Me1 and Me2 are displayed in the normal direction on either one of the two lens units 104L and 104R, and are not displayed upside down. As a result, the user can visually recognize the messages Me1 and Me2 in the normal direction.

Figure 10C:
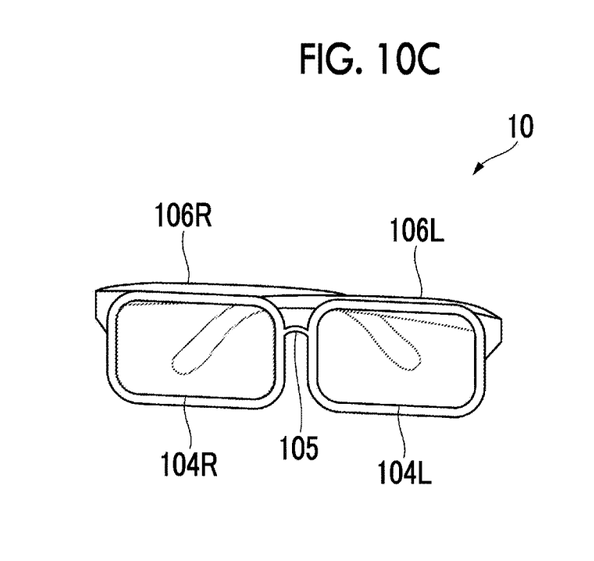
Figure 10D:
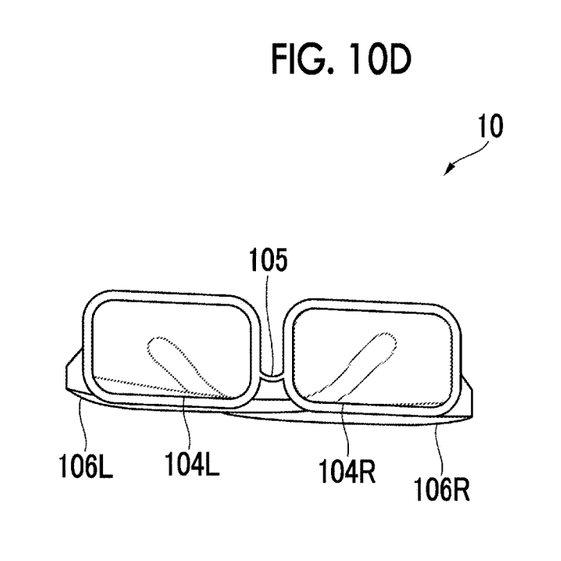

Further, when the user places the smart glasses 10, the temples 106L and 106R may be folded and placed as illustrated in FIGS. 10C and 10D. At this time, as illustrated in FIG. 10D, when display contents are displayed on the lens units 104L and 104R toward the side at which the temples 106L and 106R are folded, it is difficult for the user to visually recognize the contents from the side at which the temples 106L and 106R are folded. Therefore, for example, the display contents are displayed on the lens units 104L and 104R toward a side opposite to the side at which the temples 106L and 106R are folded.

Description on Determination of Wearing Smart Glasses

Next, in step S104 in FIG. 2, a method of the glass mode module 108 determining whether or not the user wears the smart glasses 10 will be described.

In this case, the glass mode module 108 detects whether or not the smart glasses 10 are worn on the user's head, depending on whether or not the user puts on the smart glasses 10. Specifically, the glass mode module 108 detects by the following method.

Movement Detection

The glass mode module 108 detects whether or not the user puts on the smart glasses 10 depending on whether or not the smart glasses 10 is moving. In a case where the smart glasses 10 are moving, the glass mode module 108 determines that the user puts on the smart glasses 10. On the other hand, in a case where the smart glasses 10 are not moving, the glass mode module 108 determines that the user does not put on the smart glasses 10.

Actually, for example, an acceleration sensor is provided in the smart glasses 10, and it can be determined whether or not the smart glasses 10 are moving based on a detection result of the acceleration sensor. That is, in a case where the acceleration sensor detects an acceleration, the glass mode module 108 determines that the smart glasses are moving. On the other hand, in a case where the acceleration sensor does not detect the acceleration and the acceleration is 0 for a certain period of time, the glass mode module 108 determines that the smart glasses 10 are not moving.

Contact Detection

The glass mode module 108 detects whether or not the user puts on the smart glasses 10 depending on whether or not the user is touching the smart glasses 10. In a case where the user is touching the smart glasses 10, the glass mode module 108 determines that the user puts on the smart glasses 10. On the other hand, in a case where the user is not touching the smart glasses 10, the glass mode module 108 determines that the user does not put on the smart glasses 10.

Actually, for example, a contact sensor is provided in the smart glasses 10, and it can be determined whether or not the user is touching the smart glasses 10 based on a detection result of the contact sensor. As the contact sensor, for example, a capacitance sensor can be used. The capacitance sensor is a sensor that captures a change in dielectric constant caused by a user approaching as a change in capacitance. Further, as the contact sensor, for example, a temperature sensor can be used. The temperature sensor detects a temperature, and when this temperature is close to a temperature of the user's body, it can be determined that the user is touching the smart glasses 10, and when a difference from the temperature of the user's body is large, it can be determined that the user is not touching the smart glasses 10.

Detection of Position of Temple

The glass mode module 108 detects whether or not the user puts on the smart glasses 10 depending on whether or not the temples 106L and 106R are folded. In a case where the temples 106L and 106R are not folded, the glass mode module 108 determines that the user puts on the smart glasses 10. On the other hand, in a case where the temples 106L and 106R are folded, the glass mode module 108 determines that the user does not put on the smart glasses 10.

Actually, the smart glasses 10 are provided with, for example, a switch of turning ON and OFF depending on whether or not the temples 106L and 106R are folded, and by turning ON and OFF of the switch, whether or not the user puts on the smart glasses 10 can be detected.

The acceleration sensor, the contact sensor, and the switch described above function as detection units that detect whether or not the user wears the smart glasses 10.

According to the smart glasses 10 described above, it is possible to provide a wearable terminal apparatus capable of visually recognizing display contents of a virtual screen not only when the wearable terminal apparatus is worn but also in a case where the wearable terminal apparatus are not worn.

The smart glasses 10 described above create and display the virtual screen by the smart glasses 10, and the present exemplary embodiment is not limited to this.

Figure 11:
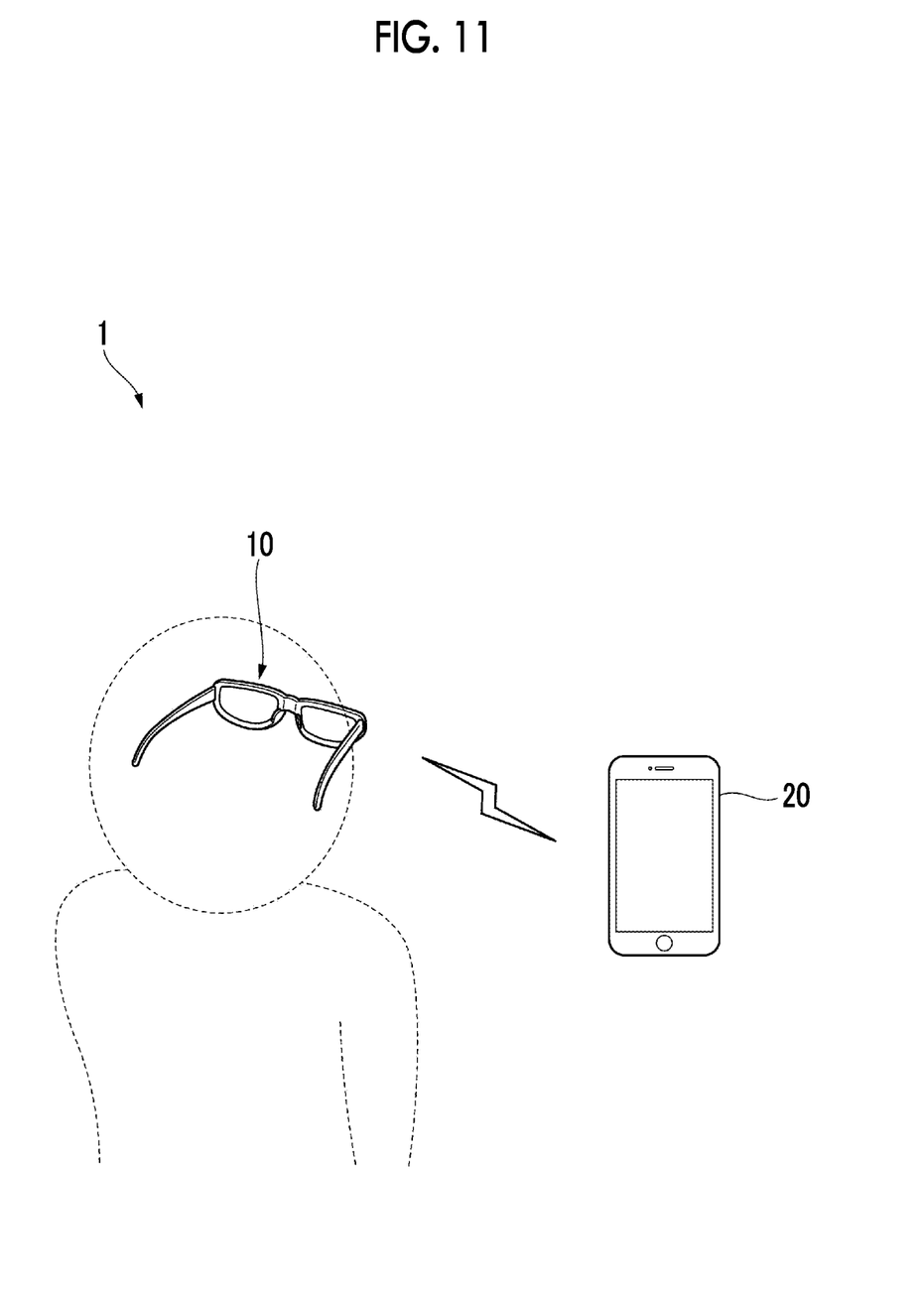
FIG. 11 is a diagram illustrating an information processing system to which the present exemplary embodiment is applied.

FIG. 11 is a diagram illustrating an information processing system 1 to which the present exemplary embodiment is applied.

The information processing system 1 illustrated in FIG. 11 includes the smart glasses 10 and a terminal apparatus 20.

The terminal apparatus 20 is, for example, a computer apparatus such as a mobile phone, a smartphone, or a tablet. The terminal apparatus 20 creates a virtual screen to be displayed on the smart glasses 10 by operating various software under control of an operating system (OS).

The terminal apparatus 20 includes a central processing unit (CPU) which is a calculation section, a main memory which is a storage section, and a storage such as a hard disk drive (HDD) and a solid state drive (SSD). Here, the CPU executes various types of software such as the OS (basic software) and application software (general-purpose software). The main memory is a storage area for storing various types of software and data used for executing the software, and the storage is a storage area for storing input data to the various types of software, output data from the various types of software, and the like.

Further, the terminal apparatus 20 includes a communication interface (hereinafter, referred to as "communication I/F") for performing communication with an outside, a display device consisting of a video memory, a display, or the like, and an input device such as a keyboard, a mouse, or a touch panel.

In the information processing system 1 according to the present exemplary embodiment, the smart glasses 10 and the terminal apparatus 20 are paired. The pairing is performed by, for example, a wireless connection such as Bluetooth (registered trademark). Meanwhile, the present exemplary embodiment is not limited to this, and the connection may be made via a wireless local area network (LAN), the Internet, or the like. Further, the connection is not limited to wireless connection, and may be wired connection via a digital visual interface (DVI), a High-Definition Multimedia Interface (HDMI) (registered trademark), a display port, Universal Serial Bus (USB), IEEE1394, RS-232C, and the like.

In the present exemplary embodiment, the virtual screen to be displayed on the smart glasses 10 is created by the terminal apparatus 20, and transmitted to the smart glasses 10 by a communication section such as Bluetooth. The smart glasses 10 display the virtual screen created by the terminal apparatus 20. In addition, by wearing of the smart glasses 10 detected by the smart glasses 10, control whether to display the virtual screen by using the laser light sources 101L and 101R or to display the display contents on the display units 134L and 134R may be performed.

Description of Program

Here, the processing performed by the smart glasses 10 according to the present exemplary embodiment described above is prepared, for example, as a program such as control software.

Therefore, the program of realizing the processing performed by the smart glasses 10 according to the present exemplary embodiment can be regarded as a program for causing a computer to implement an acquisition function of acquiring a detection result indicating whether or not a user wears an information processing apparatus, and a switching function of switching to display, when the information processing apparatus is worn on the user's head, a virtual screen superimposed on a real space S through the lens units 104L and 104R arranged in a line-of-sight direction of the user when worn on the user's head between to display, when the information processing apparatus is not worn on the user's head, a display content of the virtual screen on the lens units 104L and 104R, based on the detection result.

A program for realizing the present exemplary embodiment can be provided by a communication section as well as provided by being stored in a recording medium such as a CD-ROM or the like.

Although the present exemplary embodiments are described above, a technical scope of the exemplary embodiments of the present invention is not limited to the scope described in the exemplary embodiments described above. Various modifications or improvements are added to the exemplary embodiments described above within the technical scope of the exemplary embodiments of the present invention, and are apparent from the description of the claims.

In the embodiments above, the term "processor" refers to hardware in abroad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
    a light-transmission member disposed in a line-of-sight direction of a user when the information processing apparatus is worn on a user's head; and
    a processor configured to:
        switch between displaying of a virtual screen to be superimposed on a real space through the light-transmission member when the information processing apparatus is worn on the user's head and displaying of a display content of the virtual screen on the light-transmission member when the information processing apparatus is not worn on the user's head, wherein a density of the display content is changed with respect to the virtual screen, a first density of the display content of the virtual screen being displayed when the information processing apparatus is not being worn is higher than a second density of the virtual screen being displayed when the information processing apparatus is worn on.

2. The information processing apparatus according to claim 1,
    wherein the information processing apparatus is a glasses-type wearable terminal apparatus having two lenses as the light-transmission members, and display the display content on at least one lens.

3. The information processing apparatus according to claim 2,
    wherein one of the two lenses is used to superimpose and display the virtual screen on the real space through the light-transmission member, and
    the other lens is used to display the display content.

4. The information processing apparatus according to claim 2,
    wherein the display content is displayed on each of the two lenses to have a front-rear relationship or a front-rear reversed relationship.

5. The information processing apparatus according to claim 2,
    wherein at least one of the two lenses has a first area for displaying the virtual screen to be superimposed on the real space and a second area used for displaying the display content on the light-transmission member.

6. The information processing apparatus according to claim 5,
    wherein the first area and the second area are arranged to be vertically divided inside the lens in a case where the user wears the information processing apparatus.

7. The information processing apparatus according to claim 5,
wherein the first area is arranged at a location outside the second area in a case where the user wears the information processing apparatus.

8. The information processing apparatus according to claim 1,
wherein the display content is displayed by a light emitting element arranged on the light-transmission member.

9. The information processing apparatus according to claim 1,
wherein the information processing apparatus is a glasses-type wearable terminal apparatus having lenses as the light-transmission members and temples to be worn on user's ears, and
the processor is configured to:
detect whether or not the information processing apparatus is worn on the user's head depending on whether or not the user puts on the glasses-type wearable terminal apparatus.

10. The information processing apparatus according to claim 9, wherein the processor is configured to:
detect whether or not the user puts on the glasses-type wearable terminal apparatus depending on whether or not the information processing apparatus is moving.

11. The information processing apparatus according to claim 9, wherein the processor is configured to:
detect whether or not the user puts on the glasses-type wearable terminal apparatus depending on whether or not the user is touching the information processing apparatus.

12. The information processing apparatus according to claim 9, wherein the processor is configured to:
detect whether or not the user puts on the glasses-type wearable terminal apparatus depending on whether or not the temple is folded.

13. The information processing apparatus according to claim 12, wherein the processor is configured to:
display the display content on the lens toward a side opposite to a side on which the temple is folded, in a case where the information processing apparatus is not worn on the user's head.

14. An information processing system comprising:
a light-transmission member disposed in a line-of-sight direction of a user when an information processing apparatus is worn on a user's head;
a detection unit that detects whether or not the user wears the information processing apparatus; and
a processor configured to:
switch between displaying of a virtual screen to be superimposed on a real space through the light-transmission member when the information processing apparatus is not worn on the user's head and displaying of a display content of the virtual screen on the light-transmission member when the information processing apparatus is not worn on the user's head, wherein a density of the display content is changed with respect to the virtual screen, a first density of the display content of the virtual screen being displayed when the information processing apparatus is not being worn is higher than a second density of the virtual screen being displayed when the information processing apparatus is worn on.

15. A non-transitory computer readable medium storing a program causing a computer to realize a function, the function comprising:
acquiring a detection result indicating whether or not a user wears an information processing apparatus; and
switching between displaying of, when the information processing apparatus is worn on a user's head, a virtual screen to be superimposed on a real space through a light-transmission member disposed in a line-of-sight direction of the user when worn on the user's head and displaying of, when the information processing apparatus is not worn on the user's head, a display content of the virtual screen on the light-transmission member, based on the detection result, wherein a density of the display content is changed with respect to the virtual screen, a first density of the display content of the virtual screen being displayed when the information processing apparatus is not being worn is higher than a second density of the virtual screen being displayed when the information processing apparatus is worn on.

* * * * *